United States Patent
Levy

(10) Patent No.: US 9,665,513 B2
(45) Date of Patent: May 30, 2017

(54) SYSTEMS AND METHODS FOR AUTOMATIC ROOT PORT TO NON-TRANSPARENT BRIDGE SWITCHING FOR A PCI EXPRESS INTERCONNECT ARCHITECTURE

(71) Applicant: Paul S. Levy, Chandler, AZ (US)

(72) Inventor: Paul S. Levy, Chandler, AZ (US)

(73) Assignee: INTEL CORPORATION, Santa Clara, CA (US)

( * ) Notice: Subject to any disclaimer, the term of this patent is extended or adjusted under 35 U.S.C. 154(b) by 524 days.

(21) Appl. No.: 14/144,353

(22) Filed: Dec. 30, 2013

(65) Prior Publication Data
US 2015/0186310 A1 Jul. 2, 2015

(51) Int. Cl.
*G06F 13/12* (2006.01)
*G06F 13/28* (2006.01)

(52) U.S. Cl.
CPC ............ *G06F 13/287* (2013.01); *G06F 13/28* (2013.01)

(58) Field of Classification Search
CPC .......................... G06F 13/4022; G06F 13/4221
USPC .......................................................... 710/26
See application file for complete search history.

(56) References Cited

U.S. PATENT DOCUMENTS

| | | | | |
|---|---|---|---|---|
| 8,806,098 B1* | 8/2014 | Mandapuram | ...... | G06F 13/4022 710/104 |
| 2011/0302349 A1* | 12/2011 | Griggs | .................... | G06F 13/26 710/311 |
| 2013/0227093 A1* | 8/2013 | Maitra | ................ | G06F 13/4022 709/220 |
| 2014/0372641 A1* | 12/2014 | Hearn | ................ | G06F 13/4045 710/104 |

\* cited by examiner

*Primary Examiner* — Titus Wong
(74) *Attorney, Agent, or Firm* — The Law Office of Herbert T. Patty

(57) ABSTRACT

Systems and methods consistent with the present disclosure include techniques for automatically switching a non-transparent bridge enabled root port (NeRP) device from a non-transparent bridge configuration state and a root port configuration state. A NeRP agent consistent with the present consistent includes a root port agent within a computing fabric network coupled to a first multiplexer and to a second multiplexer. The root port agent includes training circuitry to initiate a root port configuration state upon detection of a root port. Furthermore, the training circuitry also initiates a device configuration state upon detection of an endpoint port. A non-transparent bridge device is coupled to the first multiplexer and second multiplexer. In addition, an input/output (I/O) connector is coupled to the root port agent during the root port configuration state and coupled to the local NTB device and root port agent during the device configuration state.

20 Claims, 9 Drawing Sheets

SYSTEMS AND METHODS FOR AUTOMATIC ROOT PORT TO NON-TRANSPARENT BRIDGE SWITCHING FOR A PCI EXPRESS INTERCONNECT ARCHITECTURE

FIELD

This disclosure pertains to computing systems, and in particular (but not exclusively), to techniques for automatically switching between a root port and a local non-transparent bridge within a non-transparent bridge enabled root port device for PCIe interconnect architectures.

DETAILED DESCRIPTION

Figure 1:
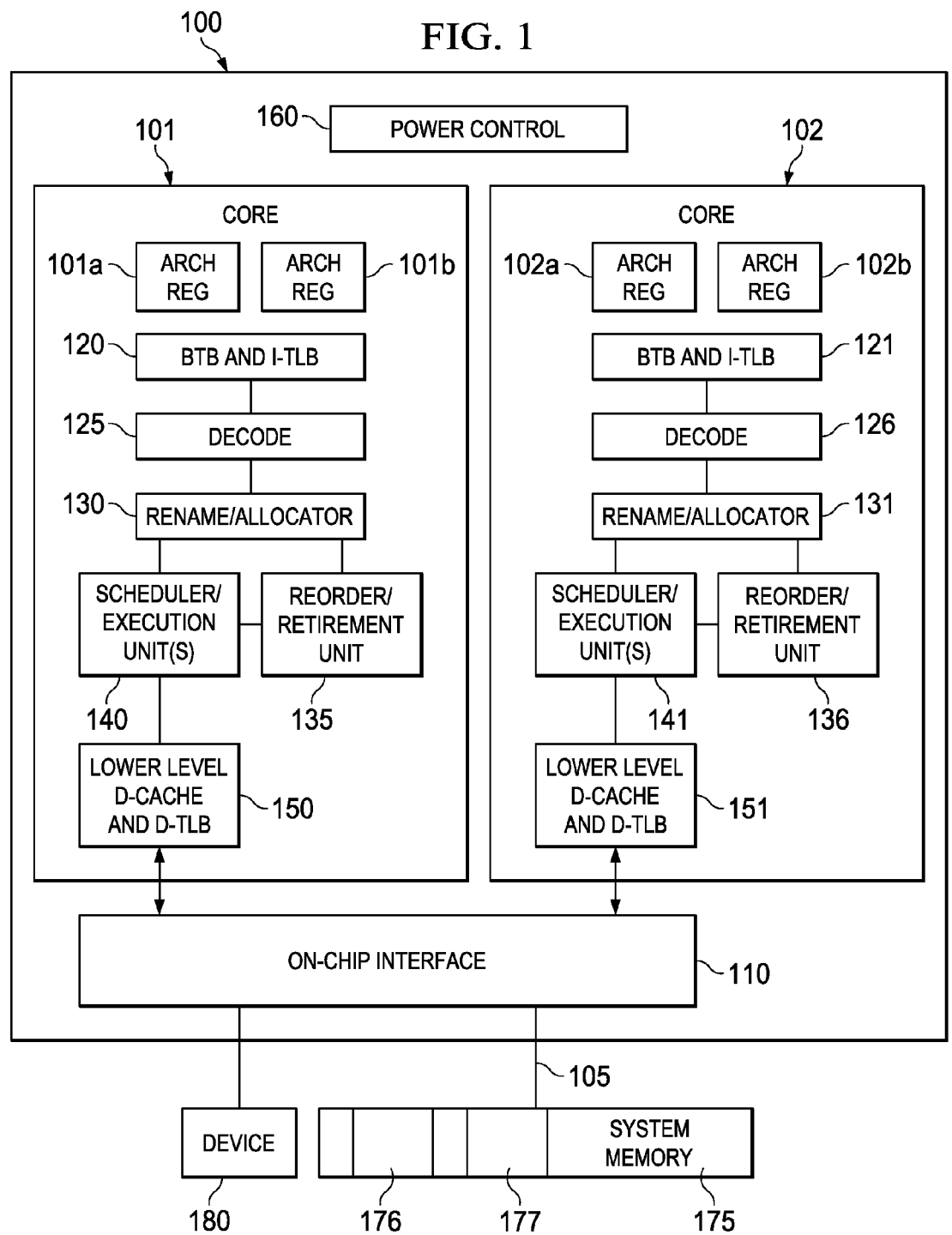
FIG. 1 is a schematic diagram illustrating an embodiment of a block diagram for a computing system including a multicore processor.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etcetera in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present disclosure.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that may perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the disclosure described herein.

Referring to FIG. 1, an embodiment of a block diagram for a computing system including a multicore processor is depicted. Processor 100 includes any processor or processing device, such as a microprocessor, an embedded processor, a digital signal processor (DSP), a network processor, a handheld processor, an application processor, a co-processor, a system on a chip (SOC), or other device to execute code. Processor 100, in one embodiment, includes at least two cores—core 101 and 102, which may include asymmetric cores or symmetric cores (the illustrated embodiment). However, processor 100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores—core 101 and 102. Here, core 101 and 102 are considered symmetric cores, i.e. cores with the same configurations, functional units, and/or logic. In another embodiment, core 101 includes an out-of-order processor core, while core 102 includes an in-order processor core. However, cores 101 and 102 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 101 are described in further detail below, as the units in core 102 operate in a similar manner in the depicted embodiment.

As depicted, core 101 includes two hardware threads 101a and 101b, which may also be referred to as hardware thread slots 101a and 101b. Therefore, software entities, such as an operating system, in one embodiment potentially view processor 100 as four separate processors, i.e., four logical processors or processing elements capable of executing four software threads concurrently. As alluded to above, a first thread is associated with architecture state registers 101a, a second thread is associated with architecture state registers 101b, a third thread may be associated with architecture state registers 102a, and a fourth thread may be associated with architecture state registers 102b. Here, each of the architecture state registers (101a, 101b, 102a, and 102b) may be referred to as processing elements, thread slots, or thread units, as described above. As illustrated, architecture state registers 101a are replicated in architecture state registers 101b, so individual architecture states/contexts are capable of being stored for logical processor 101a and logical processor 101b. In core 101, other smaller resources, such as instruction pointers and renaming logic in allocator and renamer block 130 may also be replicated for threads 101a and 101b. Some resources, such as re-order buffers in reorder/retirement units 135, 136, ILTB 120, load/store buffers, and queues may be shared through partitioning. Other resources, such as general purpose internal registers, page-table base register(s), low-level data-cache and data-TLB 115, execution unit(s) 140, 141, and portions of out-of-order unit 135, 136 are potentially fully shared.

Processor 100 often includes other resources, which may be fully shared, shared through partitioning, or dedicated by/to processing elements. In FIG. 1, an embodiment of a purely exemplary processor with illustrative logical units/resources of a processor is illustrated. Note that a processor may include, or omit, any of these functional units, as well as include any other known functional units, logic, or firmware not depicted. As illustrated, core 101 includes a simplified, representative out-of-order (OOO) processor core. But an in-order processor may be utilized in different embodiments. The OOO core includes a branch target buffer 120 to predict branches to be executed/taken and an instruction-translation buffer (I-TLB) 120 to store address translation entries for instructions.

Core 101 further includes decode module 125 coupled to fetch unit 120 to decode fetched elements. Fetch logic, in one embodiment, includes individual sequencers associated with thread slots 101a, 101b, respectively. Usually core 101 is associated with a first ISA, which defines/specifies instructions executable on processor 100. Often machine code instructions that are part of the first ISA include a portion of the instruction (referred to as an opcode), which references/specifies an instruction or operation to be performed. Decode logic 125 includes circuitry that recognizes these instructions from their opcodes and passes the decoded instructions on in the pipeline for processing as defined by the first ISA. For example, as discussed in more detail below decoders 125, in one embodiment, include logic designed or adapted to recognize specific instructions, such as transactional instruction. As a result of the recognition by decoders 125, the architecture or core 101 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 126, in one embodiment, recognize the same ISA (or a subset thereof). Alternatively, in a heterogeneous core environment, decoders 126 recognize a second ISA (either a subset of the first ISA or a distinct ISA).

In one example, allocator and renamer blocks 130, 131 include an allocator to reserve resources, such as register files to store instruction processing results. However, threads 101a and 101b are potentially capable of out-of-order execution, where allocator and renamer blocks 130, 131 also reserve other resources, such as reorder buffers to track instruction results. Units 130, 131 may also include a register renamer to rename program/instruction reference registers to other registers internal to processor 100. Reorder/retirement units 135, 136 include components, such as the reorder buffers mentioned above, load buffers, and store buffers, to support out-of-order execution and later in-order retirement of instructions executed out-of-order.

Scheduler and execution unit(s) blocks 140, 141, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffers (D-TLB) 150, 151z are coupled to execution unit(s) 140, 141. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 101 and 102 share access to higher-level or further-out cache, such as a second level cache associated with on-chip interface 110. Note that higher-level or further-out refers to cache levels increasing or getting further way from the execution unit(s). In one embodiment, higher-level cache is a last-level data cache—last cache in the memory hierarchy on processor 100—such as a second or third level data cache. However, higher level cache is not so limited, as it may be associated with or include an instruction cache. A trace cache—a type of instruction cache—instead may be coupled after decoder 125 to store recently decoded traces. Here, an instruction potentially refers to a macro-instruction (i.e. a general instruction recognized by the decoders), which may decode into a number of micro-instructions (micro-operations).

In the depicted configuration, processor 100 also includes on-chip interface module 110. Historically, a memory controller, which is described in more detail below, has been included in a computing system external to processor 100. In this scenario, on-chip interface 110 is to communicate with devices external to processor 100, such as system memory 175, a chipset (often including a memory controller hub to connect to memory 175 and an I/O controller hub to connect peripheral devices), a memory controller hub, a northbridge, or other integrated circuit. And in this scenario, bus 105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 175 may be dedicated to processor 100 or shared with other devices in a system. Common examples of types of memory 175 include DRAM, SRAM, non-volatile memory (NV memory), and other known storage devices. Note that device 180 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 100. For example in one embodiment, a memory controller hub is on the same package and/or die with processor 100. Here, a portion of the core (an on-core portion) 110 includes one or more controller(s) for interfacing with other devices such as memory 175 or a graphics device 180. The configuration including an interconnect and controllers for interfacing with such devices is often referred to as an on-core (or un-core configuration). As an example, on-chip interface 110 includes a ring interconnect for on-chip communication and a high-speed serial point-to-point link 105 for off-chip communication. Yet, in the SOC environment, even more devices, such as the network interface, co-processors, memory 175, graphics processor 180, and any other known computer devices/interface may be integrated on a single die or integrated circuit to provide small form factor with high functionality and low power consumption.

In one embodiment, processor 100 is capable of executing a compiler, optimization, and/or translator code 177 to compile, translate, and/or optimize application code 176 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etcetera in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

One interconnect fabric architecture includes the Peripheral Component Interconnect (PCI) Express (PCIe) architecture. A primary goal of PCIe is to enable components and devices from different vendors to inter-operate in an open architecture, spanning multiple market segments; Clients (Desktops and Mobile), Servers (Standard and Enterprise), and Embedded and Communication devices. PCI Express is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, Switch-based technology, and packetized protocol to deliver new levels of performance and features.

Power Management, Quality Of Service (QoS), Hot-Plug/Hot-Swap support, Data Integrity, and Error Handling are among some of the advanced features supported by PCI Express.

Figure 2:
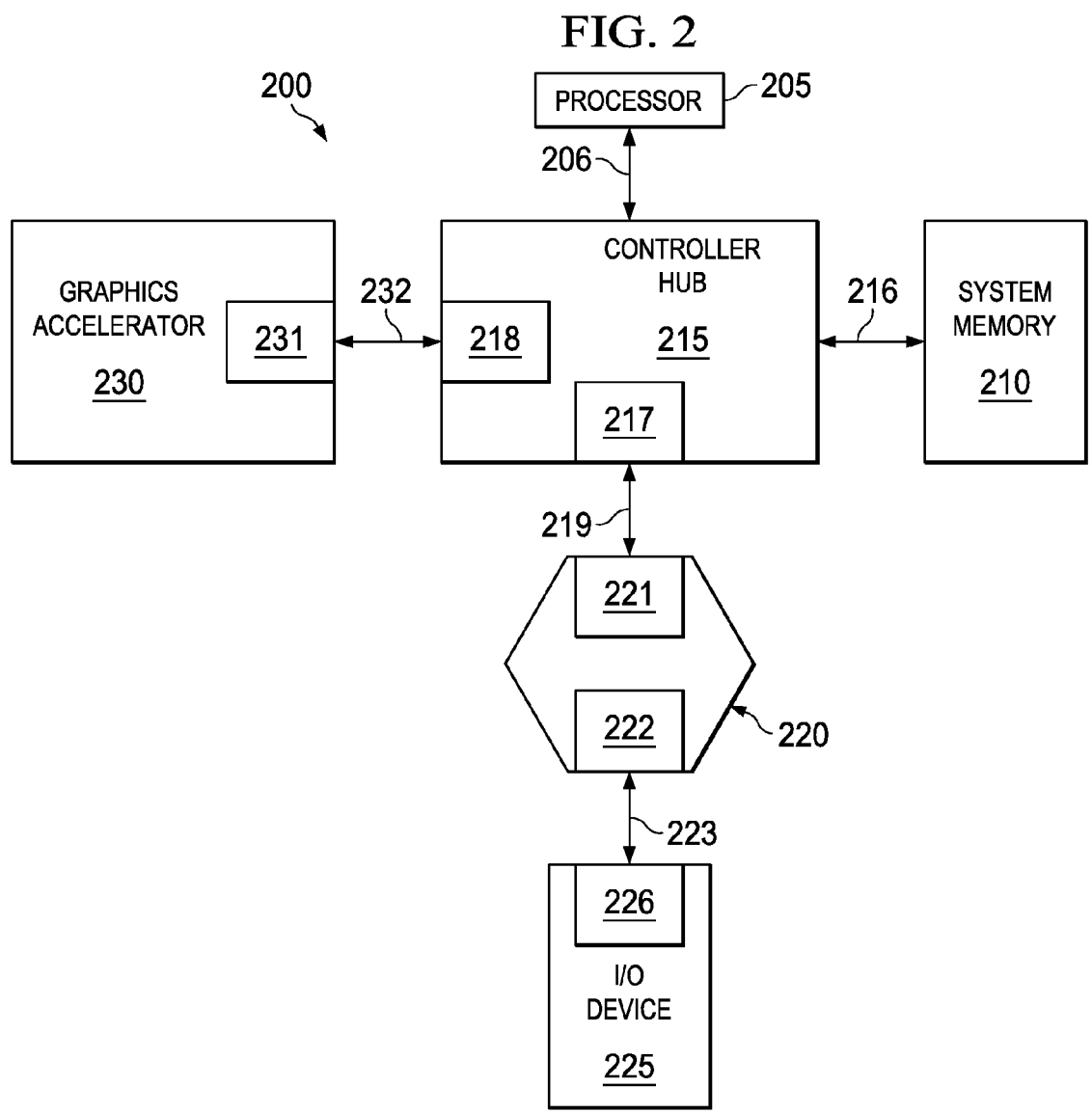
FIG. 2 is a schematic diagram illustrating an embodiment of a computing system including a peripheral component interconnect express (PCIe) compliant architecture.

Referring to FIG. 2, an embodiment of a fabric composed of point-to-point Links that interconnect a set of components is illustrated. System 200 includes processor 205 and system memory 210 coupled to controller hub 215. Processor 205 includes any processing element, such as a microprocessor, a host processor, an embedded processor, a co-processor, or other processor. Processor 205 is coupled to controller hub 215 through front-side bus (FSB) 206. In one embodiment, FSB 206 is a serial point-to-point interconnect as described below. In another embodiment, link 206 includes a serial, differential interconnect architecture that is compliant with different interconnect standard.

System memory 210 includes any memory device, such as random access memory (RAM), non-volatile (NV) memory, or other memory accessible by devices in system 200. System memory 210 is coupled to controller hub 215 through memory interface 216. Examples of a memory interface include a double-data rate (DDR) memory interface, a dual-channel DDR memory interface, and a dynamic RAM (DRAM) memory interface.

In one embodiment, controller hub 215 is a root hub, root complex, or root controller in a Peripheral Component Interconnect Express (PCIe or PCIE) interconnection hierarchy. Examples of controller hub 215 include a chipset, a memory controller hub (MCH), a northbridge, an interconnect controller hub (ICH), a southbridge, and a root controller/hub. Often the term chipset refers to two physically separate controller hubs, i.e. a memory controller hub (MCH) coupled to an interconnect controller hub (ICH). Note that current systems often include the MCH integrated with processor 205, while controller 215 is to communicate with I/O devices, in a similar manner as described below. In one embodiment, peer-to-peer routing is optionally supported through the root complex device.

Here, controller hub 215 is coupled to switch/bridge 220 through serial link 219. Input/output modules 217 and 221, which may also be referred to as interfaces/ports 217 and 221, include/implement a layered protocol stack to provide communication between controller hub 215 and switch 220. In one embodiment, multiple devices are capable of being coupled to switch 220.

Switch/bridge 220 routes packets/messages from device 225 upstream, i.e. up a hierarchy towards a root complex, to controller hub 215 and downstream, i.e. down a hierarchy away from a root controller, from processor 205 or system memory 210 to device 225 (i.e. interface ports 22, 226 through serial link 223). Switch 220, in one embodiment, is referred to as a logical assembly of multiple virtual PCI-to-PCI bridge devices. Device 225 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 225 may include a PCIe to PCI/PCI-X bridge to support legacy or other version PCI devices. Endpoint devices in PCIe are often classified as legacy, PCIe, or root complex integrated endpoints.

Graphics accelerator 230 is also coupled to controller hub 215 through serial link 232. In one embodiment, graphics accelerator 230 is coupled to an MCH, which is coupled to an ICH. Switch 220, and accordingly I/O device 225, is then coupled to the ICH. I/O modules 231 and 218 are also to implement a layered protocol stack to communicate between graphics accelerator 230 and controller hub 215. Similar to the MCH discussion above, a graphics controller or the graphics accelerator 230 itself may be integrated in processor 205.

Figure 3:
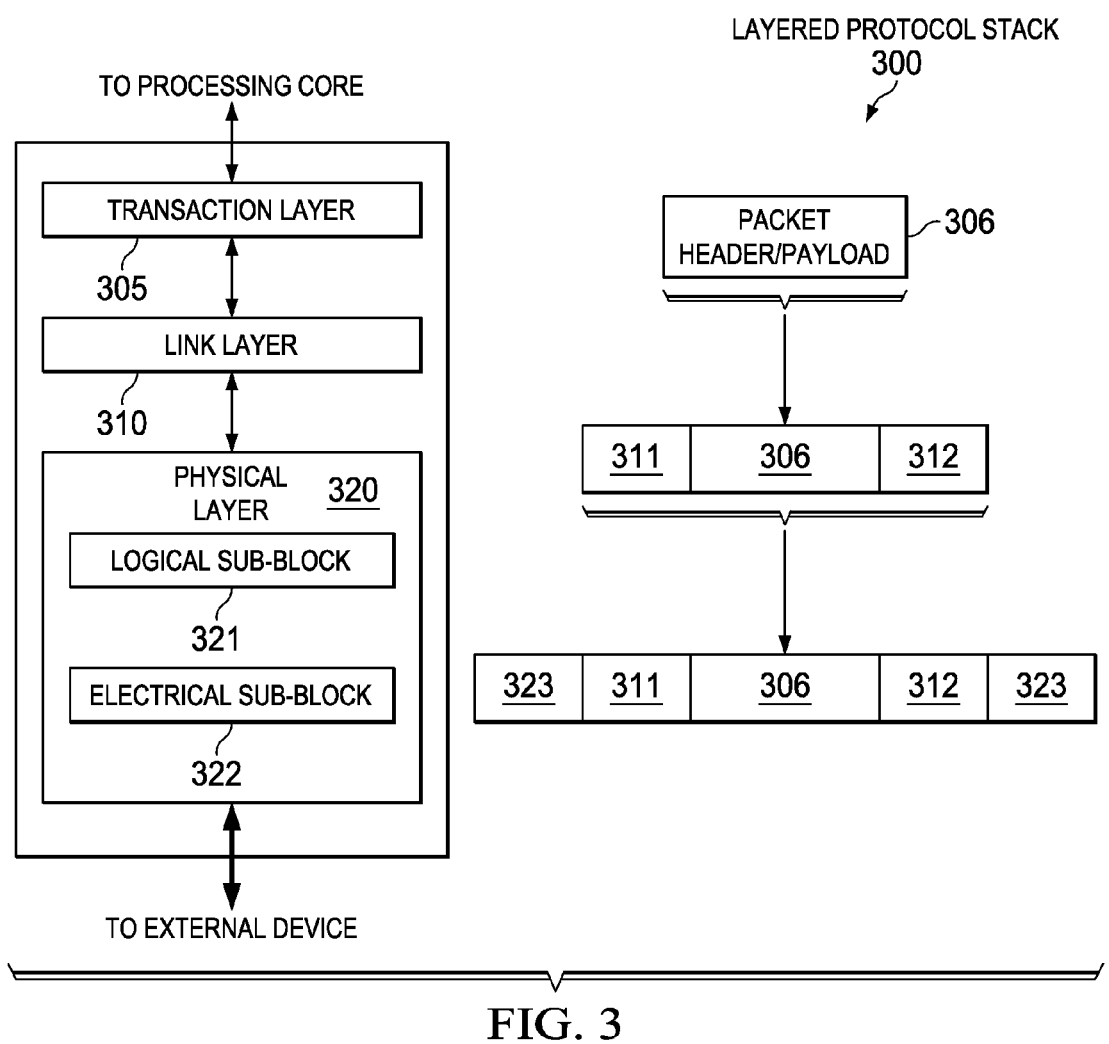
FIG. 3 is a schematic diagram illustrating an embodiment of a PCIe compliant interconnect architecture including a layered stack.

Turning to FIG. 3 an embodiment of a layered protocol stack is illustrated. Layered protocol stack 300 includes any form of a layered communication stack, such as a Quick Path Interconnect (QPI) stack, a PCIe stack, a next generation high performance computing interconnect stack, or other layered stack. Although the discussion immediately below in reference to FIGS. 2-5 are in relation to a PCIe stack, the same concepts may be applied to other interconnect stacks. In one embodiment, protocol stack 300 is a PCIe protocol stack including transaction layer 305, link layer 310, and physical layer 320. An interface, such as interfaces 217, 218, 221, 222, 226, and 231 in FIG. 2, may be represented as communication protocol stack 300. Representation as a communication protocol stack may also be referred to as a module or interface implementing/including a protocol stack.

PCI Express uses packets to communicate information between components. Packets are formed in the Transaction Layer 305 and Data Link Layer 310 to carry the information from the transmitting component to the receiving component. As the transmitted packets flow through the other layers, they are extended with additional information necessary to handle packets at those layers. At the receiving side the reverse process occurs and packets get transformed from their Physical Layer 320 representation to the Data Link Layer 310 representation and finally (for Transaction Layer Packets) to the form that may be processed by the Transaction Layer 305 of the receiving device.

Transaction Layer

In one embodiment, transaction layer 305 is to provide an interface between a device's processing core and the interconnect architecture, such as data link layer 310 and physical layer 320. In this regard, a primary responsibility of the transaction layer 305 is the assembly and disassembly of packets (i.e., transaction layer packets, or TLPs). The transaction layer 305 typically manages credit-base flow control for TLPs. PCIe implements split transactions, i.e. transactions with request and response separated by time, allowing a link to carry other traffic while the target device gathers data for the response.

In addition PCIe utilizes credit-based flow control. In this scheme, a device advertises an initial amount of credit for each of the receive buffers in Transaction Layer 305. An external device at the opposite end of the link, such as controller hub 115 in FIG. 1, which counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message space transactions (or, simply messages) are defined to support in-band communication between PCIe agents.

Therefore, in one embodiment, transaction layer 305 assembles packet header/payload 306. Format for current packet headers/payloads may be found in the PCIe specification at the PCIe specification website.

Figure 4:
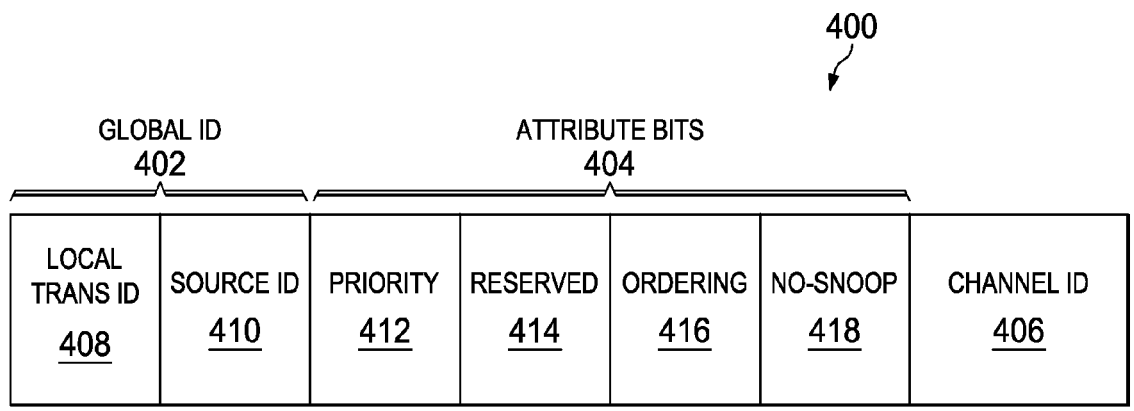
FIG. 4 is a schematic diagram illustrating an embodiment of a PCIe compliant request or packet to be generated or received within an interconnect architecture.

Quickly referring to FIG. 4, an embodiment of a PCIe transaction descriptor is illustrated. In one embodiment, transaction descriptor 400 is a mechanism for carrying transaction information. In this regard, transaction descriptor 400 supports identification of transactions in a system. Other potential uses include tracking modifications of default transaction ordering and association of transaction with channels.

Transaction descriptor 400 includes global identifier field 402, attributes field 404 and channel identifier field 406. In the illustrated example, global identifier field 402 is depicted comprising local transaction identifier field 408 and source identifier field 410. In one embodiment, global transaction identifier 402 is unique for all outstanding requests.

According to one implementation, local transaction identifier field 408 is a field generated by a requesting agent, and it is unique for all outstanding requests that require a completion for that requesting agent. Furthermore, in this example, source identifier 410 uniquely identifies the requestor agent within a PCIe hierarchy. Accordingly, together with source ID 410, local transaction identifier 408 field provides global identification of a transaction within a hierarchy domain.

Attributes field 404 specifies characteristics and relationships of the transaction. In this regard, attributes field 404 is potentially used to provide additional information that allows modification of the default handling of transactions. In one embodiment, attributes field 404 includes priority field 412, reserved field 414, ordering field 416, and no-snoop field 418. Here, priority sub-field 412 may be modified by an initiator to assign a priority to the transaction. Reserved attribute field 414 is left reserved for future, or vendor-defined usage. Possible usage models using priority or security attributes may be implemented using the reserved attribute field.

In this example, ordering attribute field 416 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes may pass writes in the same direction, and read completions may pass writes in the same direction. Snoop attribute field 418 is utilized to determine if transactions are snooped. As shown, channel ID Field 406 identifies a channel that a transaction is associated with.

Link Layer (refer to FIG. 3)

Link layer 310, also referred to as data link layer 310, acts as an intermediate stage between transaction layer 305 and the physical layer 320. In one embodiment, a responsibility of the data link layer 310 is providing a reliable mechanism for exchanging Transaction Layer Packets (TLPs) between two components a link. One side of the Data Link Layer 310 accepts TLPs assembled by the Transaction Layer 305, applies packet sequence identifier 311, i.e. an identification number or packet number, calculates and applies an error detection code, i.e. CRC 312, and submits the modified TLPs to the Physical Layer 320 for transmission across a physical to an external device.

Physical Layer

In one embodiment, physical layer 320 includes logical sub block 321 and electrical sub-block 322 to physically transmit a packet to an external device. Here, logical sub-block 321 is responsible for the "digital" functions of Physical Layer 321. In this regard, the logical sub-block includes a transmit section to prepare outgoing information for transmission by physical sub-block 322, and a receiver section to identify and prepare received information before passing it to the Link Layer 310.

Physical block 322 includes a transmitter and a receiver. The transmitter is supplied by logical sub-block 321 with symbols, which the transmitter serializes and transmits onto to an external device. The receiver is supplied with serialized symbols from an external device and transforms the received signals into a bit-stream. The bit-stream is de-serialized and supplied to logical sub-block 321. In one embodiment, an 8b/10b transmission code is employed, where ten-bit symbols are transmitted/received. Here, special symbols are used to frame a packet with frames 323. In addition, in one example, the receiver also provides a symbol clock recovered from the incoming serial stream.

As stated above, although transaction layer 305, link layer 310, and physical layer 320 are discussed in reference to a specific embodiment of a PCIe protocol stack, a layered protocol stack is not so limited. In fact, any layered protocol may be included/implemented. As an example, a port/interface that is represented as a layered protocol includes: (1) a first layer to assemble packets, i.e. a transaction layer; a second layer to sequence packets, i.e. a link layer; and a third layer to transmit the packets, i.e. a physical layer. As a specific example, a common standard interface (CSI) layered protocol is utilized.

As the frequency of serial links increase and chips migrate to new process technologies with ever decreasing device sizes, it becomes increasingly important to provide the capability to dynamically adjust the transmitter and receiver equalization settings to account for platform and silicon variations.

PCIe Generation 3 (PCIe Gen3) is an example of an industry standard that has equalization on a per transmitter-receiver pair basis to ensure interoperability at 8 GT/s for the wide range of systems that deploy PCIe. However, the wide variety of devices, manufactured by different vendors, with different process technologies, each with their proprietary transmitter/receiver design, and proprietary hardware algorithms to adapt makes it a challenge to design components with guaranteed interoperability.

Figure 5:
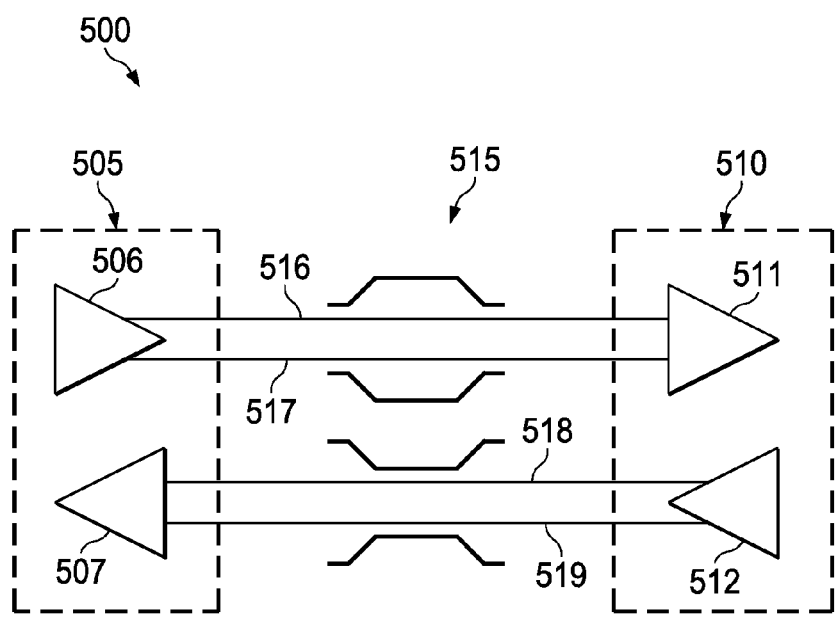
FIG. 5 is a schematic diagram illustrating an embodiment of a serial point to point fabric.

Referring next to FIG. 5, an embodiment of a PCIe serial point to point fabric is illustrated. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 506/511 and a receive pair 512/507. Accordingly, device 505 includes transmission logic 506 to transmit data to device 510 and receiving logic 507 to receive data from device 510. In other words, two transmitting paths, i.e., paths 516 and 517, and two receiving paths, i.e., paths 518 and 519, are included in a PCIe link.

A transmission path refers to any path for transmitting data, such as a transmission line, a copper line, an optical line, a wireless communication channel, an infrared communication link, or other communication path. A connection between two devices, such as device 505 and device 510, is referred to as a link, such as link 515. A link may support one lane—each lane representing a set of differential signal pairs (one pair for transmission, one pair for reception). To scale bandwidth, a link may aggregate multiple lanes denoted by xN, where N is any supported Link width, such as 1, 2, 4, 8, 12, 16, 32, 64, or wider.

A differential pair refers to two transmission paths, such as lines 516 and 517, to transmit differential signals. As an example, when line 516 toggles from a low voltage level to a high voltage level, i.e., a rising edge, line 517 drives from a high logic level to a low logic level, i.e., a falling edge. Differential signals potentially demonstrate better electrical characteristics, such as better signal integrity, i.e., cross-coupling, voltage overshoot/undershoot, ringing, etcetera. This allows for better timing window, which enables faster transmission frequencies.

Systems and methods consistent with the present disclosure include techniques for automatically switching a non-transparent bridge enabled root port (NeRP) device from a non-transparent bridge configuration state and a root port configuration state. A NeRP agent consistent with the present consistent includes a root port agent within a computing fabric network coupled to a first multiplexer and to a second multiplexer. The root port agent includes training circuitry to initiate a root port configuration state upon detection of a root port. Furthermore, the training circuitry also initiates a device configuration state upon detection of an endpoint port. A non-transparent bridge device is coupled to the first multiplexer and second multiplexer. In addition, an input/output (I/O) connector is coupled to the root port agent during the root port configuration state and coupled to the local NTB device and root port agent during the device configuration state.

Figure 6:
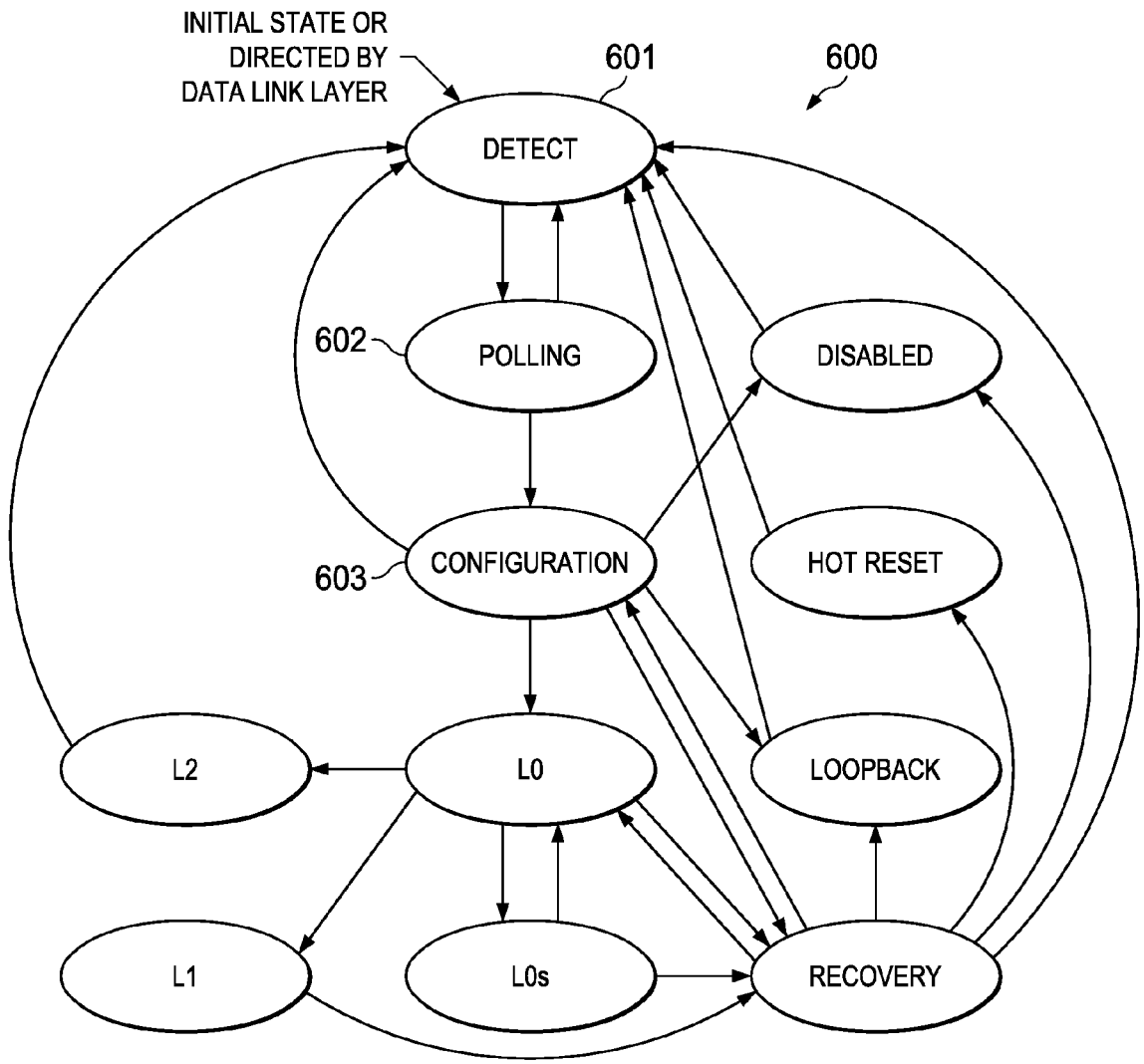
FIG. 6 is a schematic of a main state diagram for Link Training and Status State Machine consistent with a PCIe interconnect compliant architecture.

FIG. 6 is a schematic of a main state diagram 600 for Link Training and Status State Machine consistent with a PCIe interconnect compliant architecture. As shown, main state diagram 600 illustrates substates for configuring and operating a PCIe link. For example, main state diagram 600 includes substates 601 (Detection), 602 (Polling), and 603 (Configuration) which will be discussed in more detail below.

Detection substate 601 may be characterized, in part, by performing a receiver detection sequence on all un-configured lanes that may form one or more links. In the event that at least one receiver is detected on any of the un-configured lanes, the link training sequence transitions to substate 602 (Polling).

Polling substate 602 may be characterized, in part, by utilizing a transmitter to send TS1 ordered sets with lane and link numbers (Link#) to all lanes that detected a receiver during the Detection sub state 601. It should be understood by one having ordinary skill in the art with PCIe interconnect compliant systems that the PCIe protocol provides that the transmitter sends TS1 Ordered Sets with lane and link numbers set to PAD (K23.7) on all lanes that detected a receiver during Detection substate 601. Accordingly, the present disclosure deviates from standard PCIe protocol such that all downstream devices (e.g., root ports) are now responsible to transition link training from the Polling substate 602 to the Configuration substate 603.

Next, Configuration substate 603 may be characterized, in part, by negotiating a lane width and data exchange rate across each lane of each link. Advantageously, a system and method consistent with the present disclosure does not interrupt the link training state machine flow (i.e., LTSSM of PCIe). One having ordinary skill in the art may appreciate that link training for PCIe involves more substates and activities than described. However, these details are not included to avoid unnecessarily obscuring the disclosure.

Figure 7:
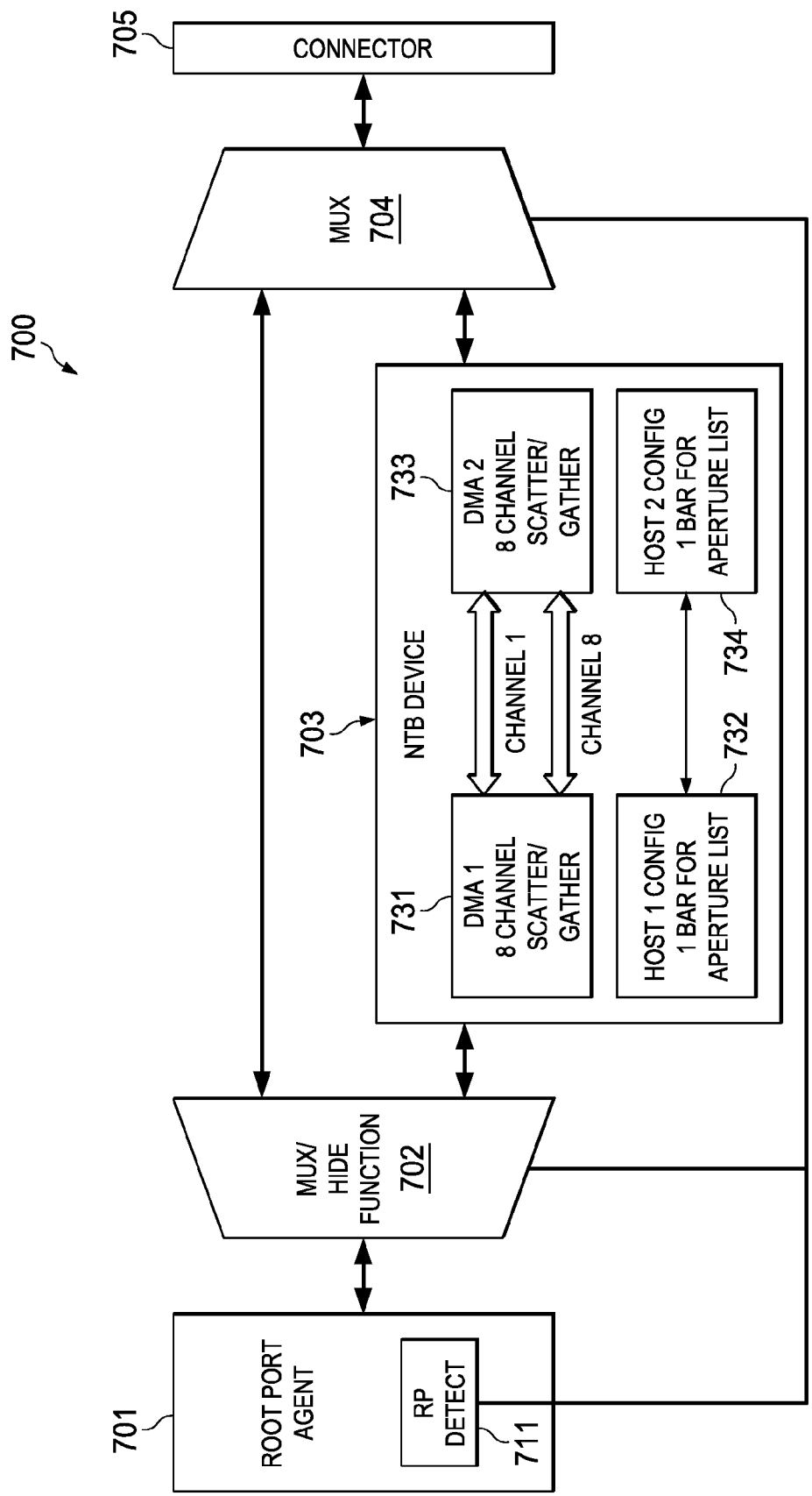
FIG. 7 is a schematic diagram illustrating an embodiment of a NTB enabled Root Port agent consistent with the present disclosure.

FIG. 7 is a schematic diagram illustrating an embodiment of a NTB enabled Root Port (NeRP) agent 700 consistent with the present disclosure. A NeRP agent 700 may switch between a non-transparent bridge (NTB) state and a root port state depending upon which type of device or system is connected to the NeRP agent 700 within a computing fabric network.

NeRP agent 700 provides several advantages over traditional hierarchy domain systems. One having ordinary skill in the art may appreciate that traditional NTB devices are used to connect two PCIe hierarchies together. Although using NTB devices to connect distinct hierarchies together may represent the lowest latency and highest bandwidth for some interconnect systems, the connection between hierarchies using this technique typically requires PCIe cabling therein limiting connections of this type to be local (e.g., within a rack).

Although traditional NTB and root port devices are limited to the type of devices to be connected with, the switching capability of NeRP agent 700 increases the functionality within computing networks by enabling connectivity to both traditional NTB devices, root port devices, other NeRP agents 700, etcetera.

Many traditional NTB device designs require prior knowledge of port use (e.g., which system is upstream or downstream). Although these parameters are programmed in the BIOS for each system, installation issues have occurred due to incorrect programming input by field technicians. Advantageously, the present disclosure provides an auto-configuration system which does not require BIOS pre-programming thereby eliminating the aforementioned issues present in traditional computing network systems.

As shown, NeRP agent 700 includes a root port agent 701 coupled to two selection devices 702, 704. In one or more embodiments, root port agent 701 may include more or less features and functionality consistent with conventional root port devices. However, as will be described below, root port agent 701 includes training circuitry 711 to detect various device/system types and to initiate one or more configurations states. In addition, root port agent 701 may include a south port to communicate with downstream peripheral devices.

In one or more embodiments, selection devices 702, 704 are multiplexers 702, 704. However, it should be appreciated by one having ordinary skill in the art that the present disclosure is not limited to multiplexers 702, 704. Therefore, selection devices 702, 704 may include any devices, components, etcetera which may select or hide the root port agent and local NTB device 703 as will be described in more detail below.

Training circuitry 711 may detect an endpoint port, root port, NTB, or NeRP agent attempting to connect to (or connected to) a computing network fabric. Furthermore, training circuitry 711 may initiate a root port configuration state upon detection of a root port or otherwise initiate a device configuration state upon detection of an endpoint port.

NeRP agent 700 further includes local NTB device 703. As shown, local NTB device 703 is coupled to multiplexers 702, 704. Local NTB device 703 is shown to include a local direct memory access (DMA) function (see blocks 731, 733), typical for most PCIe devices. In addition, NTB device 703 includes configuration space notification functionality to clearly define control plane actions such as message signaled interrupts (MSI) and mailbox status.

NTB device 703 may further include a translation table for several (e.g., "N number") of translation apertures (see blocks 732, 734). Moreover, NTB device 703 may present the unique product identification/vendor identification (PID/VID) to systems on both sides of the connection thereby not affecting the OS driver from loading. As such, local NTB device 703 may have more or less features and functionalities currently present in modern NTB devices known in the art. In addition, local NTB device 703 may include a north port to connect with upstream devices.

As previously discussed, because local NTB device 703 is also coupled to multiplexers 702, 704, local NTB device 703 may be selected and unhidden depending upon the type of device detected to the computing network fabric. As such, multiplexers 702, 704 may be configured to one of two states according to one or more embodiments of the present disclosure.

For instance, in a first state, multiplexers 702, 704 may couple root port agent 701 to local NTB device 703 and I/O connector 705 according to a certain type of device or system (e.g., non-root port device) trying to connect to the computing fabric network. However, in a second state, multiplexers 702, 704 may instead hide local NTB device 703 according to a certain type of device or system (e.g., root port device) trying to connect to the computing fabric network such that root port agent 701 is directly coupled to I/O connector 705.

Additionally, NeRP agent 700 includes input/output (I/O) connector 705 which connects devices and/or systems to a computing fabric network (which hosts the NeRP agent 700). In one or more embodiments, the I/O connector 705 is coupled to the root port agent 701 when the training circuitry 711 detects an endpoint port connecting to the computing fabric network. Alternatively, the I/O connector is coupled to the NTB device 703 (which may also be coupled to the root port agent 701) when the training circuitry 711 detects a root port device connected to the computing fabric network.

Figure 8:
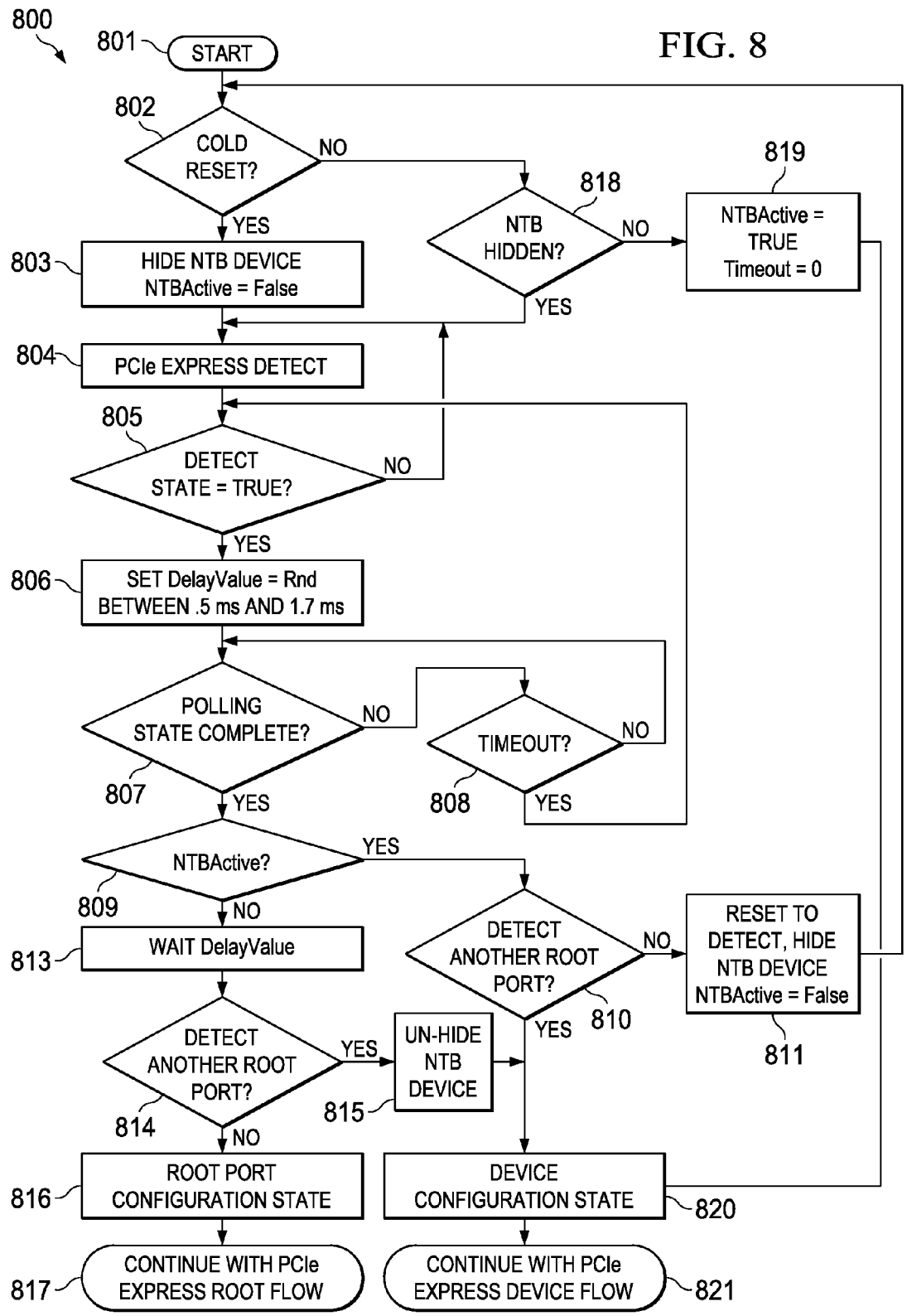
FIG. 8 is a schematic diagram illustrating an embodiment of an algorithm loop executed by a root port agent training circuitry consistent with the present disclosure.

FIG. 8 is a schematic diagram illustrating an embodiment of an algorithm loop 800 executed by a root port agent training circuitry consistent with the present disclosure. As shown, algorithm loop 800 may begin at block 801 (Arrive) and moves along to block 802 which makes a determination to whether a cold reset of the system has been performed. A "cold reset" may refer to a system reset that is generated as a result of application of main power to the system. If the training circuitry detects that a cold reset previously occurred, the algorithm loop 800 proceeds to block 803 (alternatively, the loop 800 may proceed to block 818).

At block 803, the training circuitry instructs that the local NTB device of the NeRP agent be hidden such that "NTB Active=FALSE." Next, the algorithm loop 800 moves along to block 804 to the PCIe Detect Sequence. Block 805 determines whether the "Detect State" variable is "TRUE" ("Detect State=TRUE?"). If "Detect State" is "FALSE", the algorithm loop 800 cycles back to blocks 804, 805. In the event that "Detect State" is "TRUE", the algorithm loop 800 proceeds to block 806.

Block 806 instructs to set "DelayValue=Rnd between 0.5 ms and 1.7 ms." In one or more embodiments, "Rnd" refers to "random" such that block 806 sets "DelayValue" variable to any random value between 0.5 ms and 1.7 ms. After the "DelayValue" variable has been assigned a value, algorithm loop 800 proceeds to block 807 and the training circuitry determines whether the pending state is complete. If the pending state is not complete, the algorithm loop 800 cycles through block 808 ("Timeout?") and block 806. Once the pending state is complete, the algorithm loop 800 proceeds to block 809.

In one or more embodiments, the training circuitry includes a random timer such that the training circuitry has sufficient time to determine the type of port device connecting to (or connected to) the computing fabric network. Accordingly, the random timer may extend transition from a Polling substate to a Configuration substate to any random time between 0.5 ms and 1.7 ms.

It should be understood by one having ordinary skill in the art that "Pending State Complete" refers to a connected port device's configuration status. Accordingly, once the connected port device transitions to the Configuration substate from the Polling substate, block 807 is "TRUE." On the contrary, if the connected port has yet to transition to the Configuration substate, block 807 is "FALSE." According to one or more embodiments of the present disclosure (e.g., consistent with PCIe), a connected port device is expected to transition from the Polling substate to the Configuration substate within 2 ms (e.g., exemplary timeout period—block 808).

At block 809, the training circuitry determines whether the local NTB device is active ("NTB Active=TRUE?"). If block 809 is "TRUE," algorithm loop 800 proceeds to block 810 (alternatively, loop 800 may proceed to block 813). At block 810, the training circuitry determines whether another root port is detected ("Detect Another Root Port?"). If block 810 is "FALSE," algorithm loop 800 proceeds to block 811 ("Reset to Detect, Hide NTB Device, NTB Active=FALSE") and in time proceeds to block 801. In contrast, if block 810 is "TRUE", algorithm loop 800 proceeds to device configuration state 820 and with a PCIe device flow consistent with the PCIe standard protocol.

However, if block 809 is "FALSE," algorithm loop 800 proceeds to block 813 ("Wait DelayValue"). The "DelayValue" variable was set at block 806 ("DelayValue=Rnd between 0.5 ms and 1.7 ms"). For instance, the "DelayValue" may be set to 1 ms. In one or more embodiments, the "DelayValue" variable holds off the NeRP agent transition from the Polling substate to the Configuration substate to determine whether the connected port device is a root port device. In the event that the NeRP agent detects that the connected port transitioned from Polling to Configuration substate, the NeRP agent will determine that the connected port device is a root port device according to one or more embodiments consistent with the present disclosure.

After block 813, algorithm loop 800 proceeds to block 814 ("Detect another Root Port?"). If block 814 is "TRUE", algorithm loop 800 proceeds to 816 ("Root Port Configuration State") and in time proceeds to block 817 ("Continue with PCI Express Link Training Root Flow").

Alternatively, if block 814 is "TRUE," algorithm loop 800 proceeds to block 815 ("Un-Hide NTB Device"). As such, if a root port is detected on the computing fabric network, the local NTB device of the NeRP agent is unhidden. Next, algorithm loop 800 proceeds to block 820 ("Device Configuration State") and to block 821 ("Continue with PCI Express Link Training Express Device Flow").

The PCI Express Base Specification Revision 3.x (which may be found at http://www.pcisig.com/home) along with other revisions of PCIe specifications, may be used as a resource to reference PCIe's link training root and device sequence flows. It should be understood that although the present disclosure is directed to PCIe, the present disclosure is not so limited. The present disclosure may be applicable to past or future revisions of PCI Express which may be held in different locations (in addition to non-PCIe standard protocols).

Returning back to block 802, if block 802 is "FALSE," algorithm loop 800 proceeds to block 818 ("NTB Hidden?"). Next, the "NTB Active" variable is set to "TRUE" and the "Timeout" variable is set to zero ("NTB Active=TRUE, Timeout=0") according to block 819.

Figure 9:
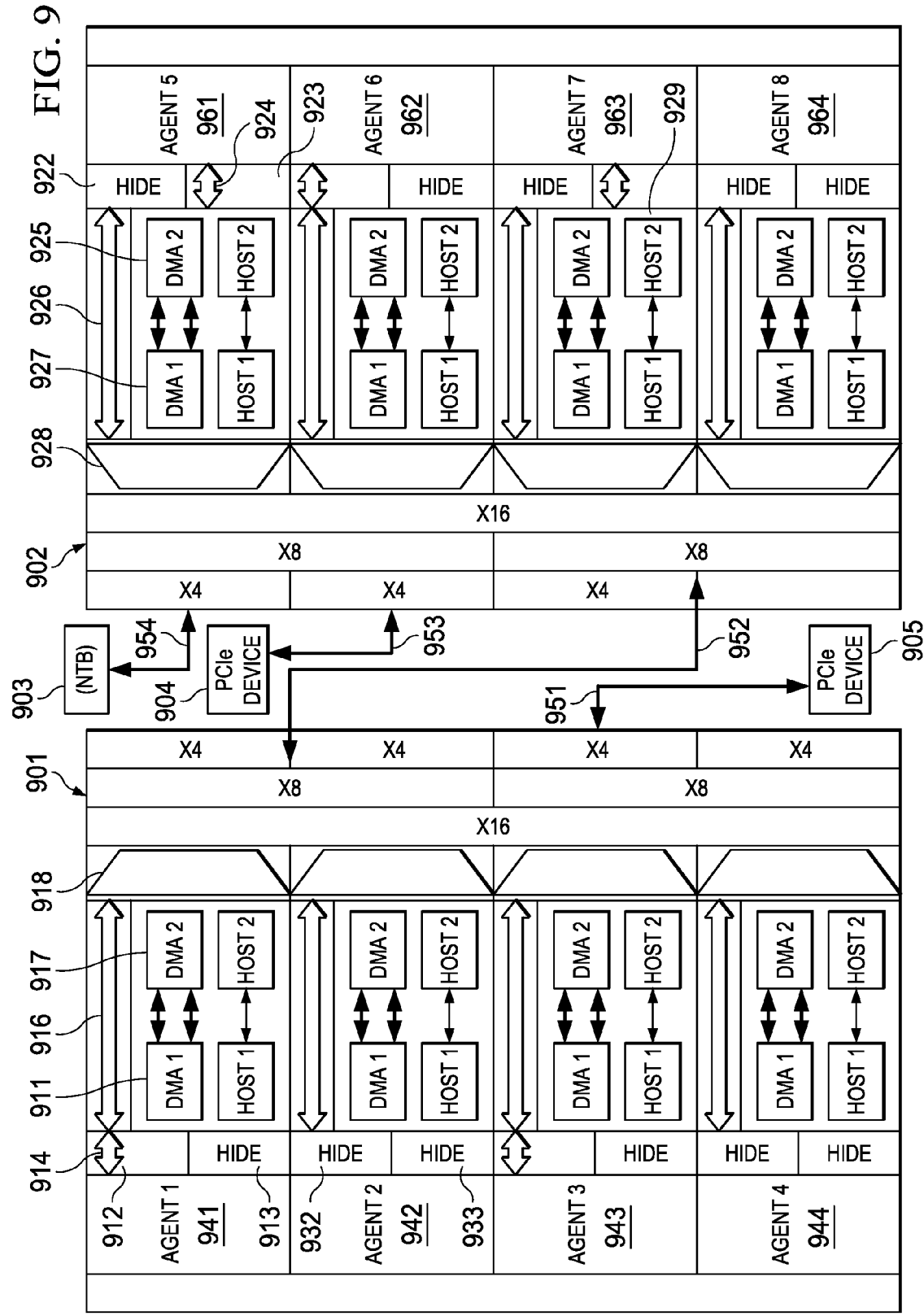
FIG. 9 is a schematic diagram illustrating an embodiment of a plurality of systems comprising NeRP agents, peripheral devices, etcetera.

FIG. 9 is a block diagram illustrating an embodiment of a plurality of systems 901—903 comprising various NeRP agents, NTB devices, root ports, peripheral devices, etcetera. System 901 includes, for example, four NeRP agents; System 902 includes four NeRP agents; and System 903 includes a NTB device. One having ordinary skill in the art may appreciate that the present disclosure may be adapted to any number of systems and may incorporate various devices including, but not limited to, the devices shown in FIG. 9.

In System 901, four NeRP agents 941-944 each includes a root port agent (e.g., Root Port Agents 1-4) and a local NTB device. Accordingly, the NeRP agents 941-944 may include the features and functionality of the NeRP agent 700 illustrated in FIG. 7. In particular, a NeRP agent 941 is coupled to NeRP agent 963 of System 902 via link 942.

In one or more embodiments, the cross lines 911 upon the local NTB device 917 indicates that NeRP agent 941 is operating in a root port configuration mode. Therefore, the local NTB device is hidden as indicated by the "Hide" variable present in NTB device field 913. In contrast, a double arrow 914 is present in root port field 912 to indicate that the root port agent (i.e., Root Port Agent 1) of the NeRP agent 941 is active. As such, in the present configuration of NeRP agent 941, selection devices 702, 704 (e.g., muxes) are configured to hide the local NTB device 917 and expose Root Port Agent 1. Furthermore, double arrow 916 indicates that Root Port Agent 1 is coupled to an I/O connector (not shown) via multiplexer device 918.

Next, the root port agent field 932 and NTB device field 933 of NeRP agent 942 both include the "Hide" variable which indicates that NeRP agent 942 is in idle mode. Accordingly, no external device or system is shown connected to NeRP agent 942. Likewise, the root port and NTB device fields of NeRP agent 944 also contain the "Hide" variable which indicates that NeRP agent 944 is also idle.

Lastly, NeRP agent 943 of System 901 is shown to be connected to an external PCIe device 905. As such, consistent with the present disclosure, NeRP agent 943 operates in the root port configuration mode such that the Root Port Agent 3 is exposed and coupled to the PCIe device 905 (through a link 951) while the local NTB device is hidden.

System 902 includes NeRP agents 961-964 which include features and functionality (e.g., DMA block 927) consistent with NeRP agent 700 shown in FIG. 7. For instance, the root port agent and NTB device fields 922, 923 of NeRP agent 961 indicates that the device 961 is operating in a device configuration mode. The "Hide" variable in the root port agent field 922 indicates that Root Port Agent 5 is hidden whereas the double arrow 924 in the NTB device field 923 indicates that the local NTB device 925 within NeRP agent 961 is active. Accordingly, the local NTB device 925 is coupled to an I/O connector (not shown) as indicated by double arrow 926 via a selection device (i.e., multiplexer device 928). NeRP agent 961 is also shown to be connected to System 903 via link 954. In the embodiment shown, NeRP agent 961 may be connected to a NTB device within System 903.

Next, NeRP agent 962 indicates that it is operating in root port configuration mode. In addition, NeRP agent 962 is shown to be connected to a PCIe device 904 via link 953. As discussed previously, NeRP agent 963 is connected to NeRP agent 941 of System 901. In the embodiment shown, NeRP agent 963 is operating in device configuration mode such that the local NTB device 929 operates as a downstream device whereas Root Port Agent 1 of the NeRP agent 941 operates as an upstream device.

Lastly, NeRP agent 964 is shown to include "Hide" variables in both the root port agent and NTB device fields. As such, NeRP agent 964 is currently in an idle state. In time, NeRP agent 964 may be connected to or attempting to connect to a root port, peripheral device (e.g., PCIe device), another NeRP agent, etcetera.

Figure 10:
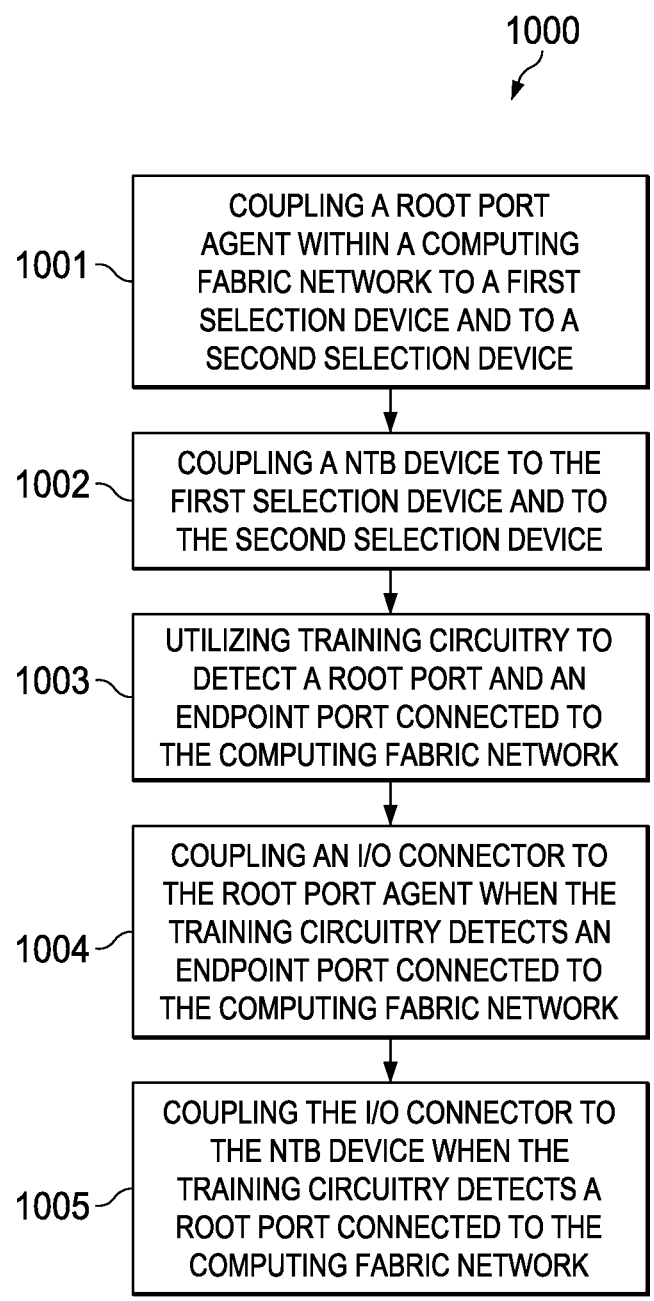
FIG. 10 is a flowchart of a method consistent with the present disclosure.

FIG. 10 is a flowchart 1000 of a method consistent with the present disclosure. As shown, flowchart 1000 may begin with block 1001 which provides coupling a root port agent within a computing fabric network to a first selection device and to a second selection device. As previously discussed, the selection devices may include multiplexers according to one or more embodiments of the present disclosure.

Next, block 1002 provides coupling a NTB device to the first selection device and to the second selection device. As described in the present disclosure, a NeRP agent includes a root port agent and a local NTB device. Accordingly, the first and second selection devices may be configured in one or more states such that the local NTB device is hidden or is coupled to the root port and the I/O connector.

Block 1003 provides utilizing training circuitry to detect a root port and an endpoint port connected to the computing fabric network. As discussed above with reference to FIG. 8, training circuitry present within the root port agent of the NeRP agent may detect the presence of various devices and/or systems connected to the computing fabric network.

Block 1004 provides coupling an I/O connector of the NeRP agent to the root port agent when the training circuitry detects an endpoint port connected to the computing fabric network. For instance, if a peripheral device such as a PCIe device initiates a connection to the computing fabric network (e.g., undergoing link training to achieve a "Configuration" substate), the training circuitry will detect the connection event and instruct the selection devices to hide the local NTB device and expose the root port agent of the NeRP agent.

Lastly, block 1005 provides coupling the I/O connector port to the NTB device when the training circuitry detects a root port connected to the computing fabric network. In one or more embodiments of the present disclosure, the training circuitry may detect when a root port undergoes a training sequence to connect to the computing fabric network. As such, the NeRP agent may transition to a device configuration mode such that the selection devices are configured to expose the local NTB device which is coupled to the root port agent and I/O connector.

In addition, according to one or more embodiments, because two NeRP agents should not transition from the root configuration to/from the device configuration mode at the same time, the training circuitry may therefore institute the use of a random backoff timer to ensure that only one NTB device is activated when two NeRP agents initiate a connection. Therefore, only one of the local NTB devices will have a south or north port while the other local NTB device of the other NeRP agent will have the opposite port such that one of the local NTB devices operates as an upstream device while the other local NTB device operates as a downstream device.

That is to say, when two NeRP agents are connected to each other, one of the NeRP agents assumes a root port configuration while the other assumes an endpoint configuration by switching in the local NTB device. Therefore, the NeRP agents may create a path from a first root port agent of a first NeRP agent to a local NTB to a second root port agent of a second NeRP agent.

In one or more embodiments of the present disclosure, two NeRP agents may be connected by assigning a unique value to the "DelayValue" variables of each NeRP agent. In the event that the values of the "DelayValue" variables in both systems are the same, a timeout event will likely occur and two unique values would be selected and assigned to the "DelayValue" variables. Notably, for non-NeRP agent devices, all root port agents transition immediately from the Polling substate to the Configuration substate according to some embodiments.

Accordingly, a system and method consistent with the present disclosure allows devices and system hierarchies to be connected seamlessly (e.g., plug and play) into computing fabric networks which feature NeRP agents as disclosed herein. Therefore, system hierarchies may be connected into computing fabric networks at will and in a controlled fashion while solving the limitations present in conventional systems such as removing the need of human intervention to set the direction of each port—north vs. south.

A device consistent with the present disclosure includes a root port agent within a computing fabric network to be coupled to a first selection device and to a second selection device. The root port agent includes training circuitry to detect a root port and an endpoint port connected to the computing fabric network. In addition, a non-transparent bridge (NTB) device to be coupled to the first selection device and to the second selection device.

Furthermore, the device includes an input/output (I/O) connector to be coupled to the root port agent when the training circuitry detects an endpoint port attempting to connect to the computing fabric network whereas the I/O connector is to be coupled to the NTB device when the training circuitry detects a root port attempting to connect to the computing fabric network.

In one or more embodiments, the first selection device and the second selection device are multiplexers.

In one or more embodiments, the training circuitry detects an endpoint port, when the first selection device and the second selection device are configured in a first state. In addition, when the training circuitry detects a root port, the first selection device and the second selection device are configured in a second state.

In some embodiments, the NTB device includes a direct memory access (DMA) controller.

The training circuitry includes a delay timer component to determine whether a port device attempting to connect to the computing fabric network transitions from a Polling substate to a Configuration substate. The computing fabric network may also host a root port and endpoint port connect thereto.

The computing fabric network is compliant with a Peripheral Compliant Interconnect Express (PCIe) protocol. In one more embodiments, the NTB device includes a north port and the root port agent includes a south port.

A method consistent with the present disclosure includes coupling a root port agent within a computing fabric network to a first selection device and to a second selection device network to a first selection device and to a second selection device.

The root port agent includes training circuitry to detect a root port and an endpoint port connected to the computing fabric network. Next, coupling a non-transparent bridge (NTB) device to the first selection device and to the second selection device. Utilizing the training circuitry to detect a root port and an endpoint port connected to the computing fabric network. Further, coupling an input/output (I/O) connector to the root port agent when the training circuitry detects an endpoint port connected to the computing fabric network and coupling the I/O connector to the NTB device when the training circuitry detects a root port connected to the computing fabric network.

In one or more embodiments, the method further comprises hiding the NTB device when the training circuitry detects an endpoint port connected to the computing fabric network.

In one or more embodiments, the method further comprises coupling the NTB device with the root port agent and I/O connector when the training circuitry detects a root port connected to the computing fabric network.

In one or more embodiments, the method further comprises hiding the NTB device and the root port agent when the I/O connect is neither connected to an external system hierarchy nor a peripheral device.

The root port agent and the NTB device may be coupled to the computing fabric network by a PCIe compliant link. Further, detecting a root port may include sensing a device transition to a configuration training mode.

A non-transparent bridge enabled root port (NeRP) agent consistent with the present disclosure includes training circuitry to initiate a root port configuration state upon detection of a root port or otherwise initiate a device configuration state upon detection of an endpoint port.

The training circuitry may include a random timer such that the training circuitry has sufficient time to determine a type of port device connected to the computing fabric network.

Next, a NeRP agent may include a non-transparent bridge (NTB) device to be coupled to the first multiplexer and to the second multiplexer and an input/output (I/O) connector to be coupled to the root port agent during the root port configuration state and to be coupled to the NTB device during the device configuration state.

In one or more embodiments, the training circuitry determines the type of device port connected to the computing fabric network by waiting for the port device to transition from a Polling substate to a Configuration substate. In addition, the NeRP agent configures to a port that is the opposite of the port configuration of an external NeRP agent coupled thereto.

The NeRP agent may be configured to transition from a Polling substate to a Configuration substate at a delayed time upon detection of an external NeRP agent coupled thereto. Furthermore, the random timer is to extend transition from a Polling substate to a Configuration substate to any random time between 0.5 ms and 1.7 ms.

While the present disclosure has been described with respect to a limited number of embodiments, those skilled in the art will appreciate numerous modifications and variations therefrom. It is intended that the appended claims cover all such modifications and variations as fall within the true spirit and scope of this present disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as may be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase "to" or "configured to," in one embodiment, refers to arranging, putting together, manufacturing, offering to sell, importing and/or designing an apparatus, hardware, logic, or element to perform a designated or determined task. In this example, an apparatus or element thereof that is not operating is still "configured to" perform a designated task if it is designed, coupled, and/or interconnected to perform said designated task. As a purely illustrative example, a logic gate may provide a 0 or a 1 during operation. But a logic gate "configured to" provide an enable signal to a clock does not include every potential logic gate that may provide a 1 or 0. Instead, the logic gate is one coupled in some manner that during operation the 1 or 0 output is to enable the clock. Note once again that use of the term "configured to" does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases "capable of/to," and or "operable to," in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etcetera, which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions may be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in some embodiments" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A device, comprising:
    a root port agent within a computing fabric network to be coupled to a first selection device and to a second selection device;
    wherein the root port agent includes training circuitry to detect a root port and an endpoint port connected to the computing fabric network;
    a non-transparent bridge (NTB) device to be coupled to the first selection device and to the second selection device;
    wherein the NTB device includes a translation table and configuration space notification functionality to define control message signaled interrupts and mailbox status; and
    an input/output (I/O) connector to be coupled to the root port agent when the training circuitry detects an endpoint port attempting to connect to the computing fabric network whereas the I/O connector is to be coupled to the NTB device when the training circuitry detects a root port attempting to connect to the computing fabric network.

2. The device of claim 1, wherein the first selection device and the second selection device are multiplexers.

3. The device of claim 1, wherein when the training circuitry detects an endpoint port, the first selection device and the second selection device are configured in a first state.

4. The device of claim 1, wherein when the training circuitry detects a root port, the first selection device and the second selection device are configured in a second state.

5. The device of claim 1, wherein the NTB device includes a direct memory access (DMA) controller.

6. The device of claim 1, wherein the training circuitry includes a delay timer component to determine whether a port device attempting to connect to the computing fabric network transitions from a Polling substate to a Configuration substate.

7. The device of claim 6, wherein the computing fabric network hosts a root port and endpoint port connect thereto.

8. The device of claim 1, wherein the computing fabric network is compliant with a Peripheral Compliant Interconnect Express (PCIe) protocol.

9. The device of claim 1, wherein the NTB device includes a north port and the root port agent includes a south port.

10. A method, comprising:
    coupling a root port agent within a computing fabric network to a first selection device and to a second selection device;
    wherein the root port agent includes training circuitry to detect a root port and an endpoint port connected to the computing fabric network;
    coupling a non-transparent bridge (NTB) device to the first selection device and to the second selection device;
    wherein the NTB device includes a translation table and configuration space notification functionality to define control message signaled interrupts and mailbox status;
    utilizing the training circuitry to detect a root port and an endpoint port connected to the computing fabric network; and
    coupling an input/output (I/O) connector to the root port agent when the training circuitry detects an endpoint port connected to the computing fabric network and coupling the I/O connector to the NTB device when the training circuitry detects a root port connected to the computing fabric network.

11. The method of claim 10 further comprising hiding the NTB device when the training circuitry detects an endpoint port connected to the computing fabric network.

12. The method of claim 10 further comprising coupling the NTB device with the root port agent and I/O connector when the training circuitry detects a root port connected to the computing fabric network.

13. The method of claim 10 further comprising hiding the NTB device and the root port agent when the I/O connect is neither connected to an external system hierarchy nor a peripheral device.

14. The method of claim 10, wherein the root port agent and the NTB device are coupled to the computing fabric network by a PCIe compliant link.

15. The method of claim 10, wherein detecting a root port includes sensing a device transition to a configuration training mode.

16. A non-transparent bridge enabled root port (NeRP) agent, comprising:
    a root port agent within a computing fabric network to be coupled to a first multiplexer and to a second multiplexer;
    wherein the root port agent includes training circuitry to initiate a root port configuration state upon detection of a root port or otherwise initiate a device configuration state upon detection of an endpoint port;
    wherein the training circuitry includes a random timer such that the training circuitry has enough time to determine a type of port device connected to the computing fabric network;
    a non-transparent bridge (NTB) device to be coupled to the first multiplexer and to the second multiplexer;
    wherein the NTB device includes a translation table and configuration space notification functionality to define control message signaled interrupts and mailbox status; and
    an input/output (I/O) connector to be coupled to the root port agent during the root port configuration state and to be coupled to the NTB device during the device configuration state.

17. The NeRP agent of claim 16, wherein the training circuitry determines the type of device port connected to the computing fabric network by waiting for the port device to transition from a Polling substate to a Configuration substate.

18. The NeRP agent of claim 16, wherein the NeRP agent configures to a port that is the opposite of a port configuration of an external NeRP agent coupled thereto.

19. The NeRP agent of claim 16, wherein the NeRP agent is configured to transition from a Polling substate to a Configuration substate at a delayed time upon detection of an external NeRP agent coupled thereto.

20. The NeRP agent of claim 19, wherein the random timer is to extend transition from a Polling substate to a Configuration substate to any random time between 0.5 ms and 1.7 ms.

* * * * *